March 13, 1973 B. H. PAULY ET AL 3,720,088
SPLIT COLLET CRIMPER
Original Filed Feb. 13, 1969
2 Sheets-Sheet 2

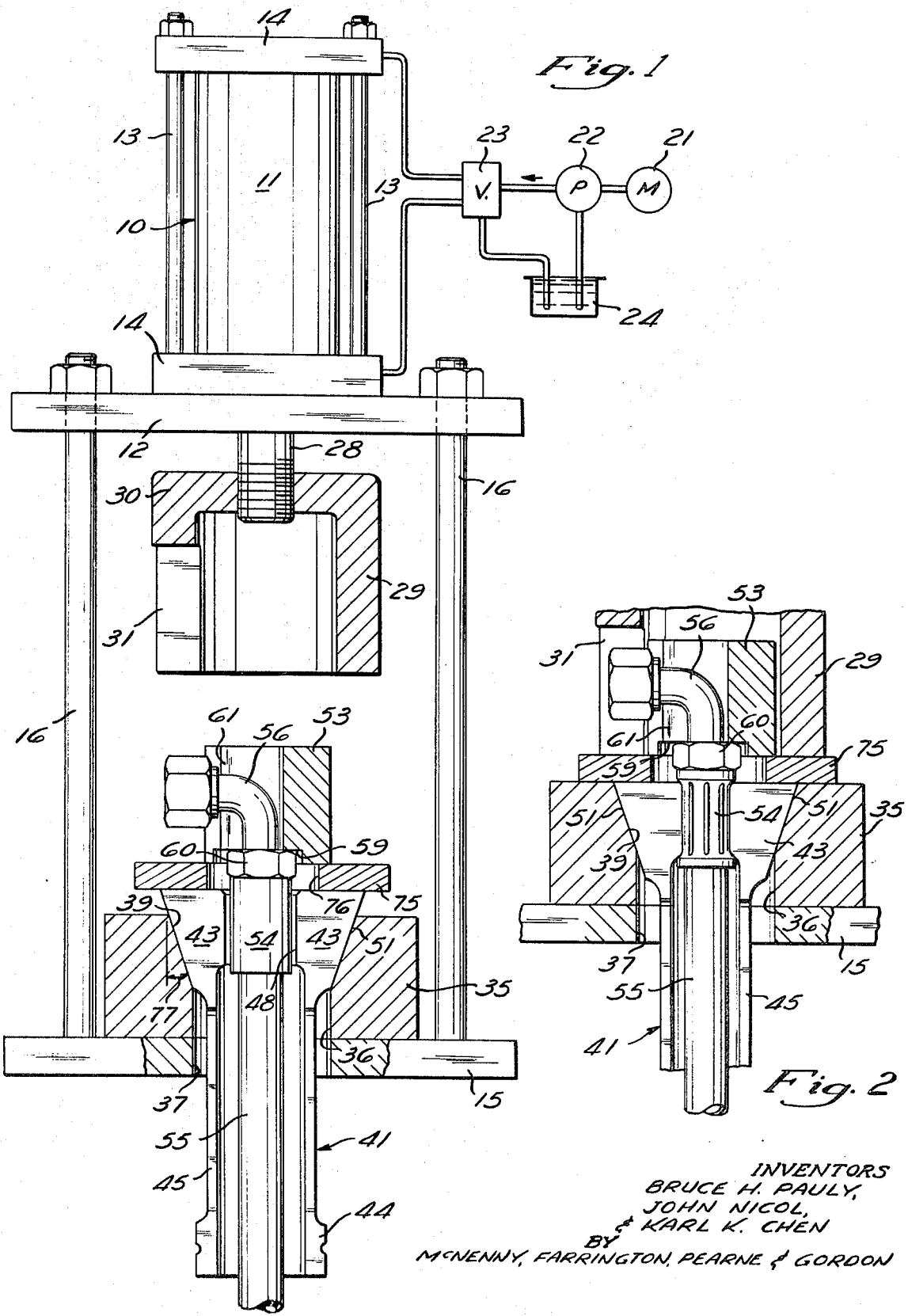

INVENTORS
BRUCE H. PAULY,
JOHN NICOL
& KARL K. CHEN
BY
McNENNY, FARRINGTON, PEARNE & GORDON
ATTORNEYS 3,720,088
SPLIT COLLET CRIMPER
Bruce H. Pauly, Chagrin Falls, Ohio, John Nicol, Palos Verdes Peninsula, Calif., and Karl K. Chen, Cleveland, Ohio, assignors to The Weatherhead Company
Continuation of abandoned application Ser. No. 798,972, Feb. 13, 1969. This application Apr. 29, 1971, Ser. No. 138,832
Int. Cl. B21d 41/00
U.S. Cl. 72—402          12 Claims

ABSTRACT OF THE DISCLOSURE

A method and apparatus are disclosed for crimping a sleeve onto a tubular member inserted therein. A spring type collet is split into two semicircular sections, each of which is provided with a plurality of spring fingers which extend axially from a base portion. The spring fingers each have an internal crimping die segment which forms a part of a circular die. An externally coned surface of the collet is forced into an internally coned socket to displace the die segments radially inwardly and crimp the sleeve. The force is applied to the collet by a cylindrical ram which is provided with a slotted side wall to receive any projecting appendage of the sleeve. The collet sections are then separated to remove the crimped sleeve.

---

This application is a streamlined continuation of Ser. No. 798,972 filed Feb. 13, 1969, now abandoned.

BACKGROUND OF THE INVENTION

This invention relates generally to a method and apparatus for attaching sleeves to tubular members inserted therein, and more particularly to such a method and apparatus in which the attachment is effected by radial deformation of the sleeve. Still more particularly, the invention relates to a crimping method and a crimping apparatus which are particularly adapted to crimping metallic end fittings to lengths of flexible hose.

In attaching metallic hose end fittings to lengths of flexible hose, it is important that the union be at least as strong as the hose itself to prevent leakage or separation under conditions of high pressure or vacuum. These fittings generally comprise a nipple portion which fits into the hose and a sleeve or ferrule which fits around the outside of the hose. The sleeve is deformed radially inwardly by a means such as a crimping machine, swaging machine, or other suitable machine, to secure the hose between the two walls.

Swaging machines for attaching such end fittings generally apply an axial force to one end of the fitting to force the sleeve through a circular swaging die of smaller diameter than the external wall to uniformly deform the external wall radially inwardly to clamp the hose. Although such swaging machines have been found to be satisfactory when applied to smaller diameter sleeves and hoses, when they are used to swage larger diameter sleeves, it has been found that the sleeve wall may collapse under the axial force that is required to force the sleeve through the swaging die. To alleviate this problem, it is necessary to either reduce the diameter of the external wall progressively through two or more dies or to provide the external wall with a greater wall thickness than would otherwise be required. Although both of these solutions may prevent the sleeve from collapsing, they are nevertheless undesirable, since they require either additional manufacturing operations or increased material costs.

Machines for crimping end fittings onto lengths of flexible hose vary widely in their structure and mode of operation, but generally include a plurality of matched, individual crimping fingers which are displaced radially inwardly by a camming action to effect the actual crimp. Although present crimping machines may operate to form a satisfactory crimp, they are nevertheless subject to certain disadvantages. Such machines are generally rather complex and expensive, and may require an extensive set-up time for changing the sleeve size or range of sleeve sizes that can be crimped. Furthermore, the crimping fingers of such machines must be able to open quite wide to allow large fittings, such as elbows or the like, to pass therethrough, thereby making such machines generally quite large and cumbersome.

These disadvantages of the prior art machines become even more important when the machines are used a field locations rather than at the manufacturing plant. Securing the end fittings to the hose at field locations is commonly done to permit the field location to supply the required length of hose from a large reel with the required end fittings, without having to stock various precut lengths of each size hose with various combinations of end fittings attached to each length. Machines for use in such field locations must be able to handle a large range of sleeve sizes without requiring a lengthy set-up time each time a different sleeve size is crimped and without requiring an expensive fixture for each size.

SUMMARY OF THE INVENTION

These and other difficulties and disadvantages of prior art machines and methods for attaching sleeves to tubular members by plastic deformation of the sleeve are overcome by the present invention, which provides a simple and inexpensive method and apparatus for plastically deforming such sleeves which may be used in either the manufacturing plant or the field location. The invention further provides such a method and apparatus that may be quickly and easily changed to accommodate various different sleeve sizes.

The invention provides a plurality of spring fingers which are joined together at one end, and which have a conical external surface and an internal crimping die segment at the other end. The internal crimping die segments of the individual spring fingers cooperatively define a circular die cavity within which the sleeve and tubular member are poistioned. Each individual spring finger die segment is then forced radially inwardly by relative axial movement between the externally coned surface of the spring fingers and a matching internally coned socket to close the die cavity and crimp the sleeve onto the tubular member.

The invention further provides a novel ram means for applying a uniform pressure to force the externally coned portion of the spring fingers into the internally coned socket when sleeves having various shaped appendages, such as elbows, connectors, or the like, are crimped onto the tubular member.

In a specific embodiment, the invention provides a spring type collet having a plurality of individual cooperating spring fingers which are joined together by a common base at one end of the collet. Each spring finger includes a spring portion which extends from the common base to a free end of the collet. At the free end of the collet, each spring finger is provided with an enlarged portion having an internal crimping die segment and a coned external surface. The die segments cooperatively define a circular die cavity within which the sleeve is placed. The externally coned surface of the free end of the spring type collet is then forced into a matching internally coned socket to force the fingers radially inwardly to close the die cavity and crimp the sleeve onto the tubular member.

In the preferred embodiment, the spring type collet is split into two cooperating sections, each of which is a substantially identical, approximately semi-circular section. By splitting the collet into two sections the sleeve may be easily inserted and removed from the die cavity without having to open the die cavity extremely wide, even when the tubular member is provided with another sleeve on its other end. This permits the machine to be much smaller than would otherwise be required if the die cavity had to open wide enough to allow removal of sleeves having projecting appendages. Furthermore, the operator need only handle two collet sections, yet any desired number of independent crimping fingers may be provided to assure uniform deformation of the sleeve.

In the specific embodiment, the axial force for pushing the crimping fingers into the internally coned socket is applied by a generally cylindrical ram in which a portion of the side wall is removed to permit an elbow or other appendage of the sleeve to project therethrough without interfering with the application of the force to the collet. This permits the ram to be of a smaller diameter than would otherwise be required if the appendage were contained within the cylindrical ram, and assures uniform application of the force to the collet.

These and other objects and advantages of the invention will become more readily apparent to those skilled in the art upon a full and comprehensive understanding of the preferred embodiment of the invention described in detail hereinafter.

BRIEF DESCRIPTION OF THE DRAWINGS

FIG. 1 is a diagrammatic side elevational view partly in cross-section of a crimping machine incorporating the principles of this invention, showing the machine in its retracted position with an uncrimped sleeve positioned therein;

FIG. 2 is a fragmentary cross-section of a portion of the machine shown in FIG. 1, but with the ram in its advanced position and with the sleeve crimped onto the tubular member;

DESCRIPTION OF THE PREFERRED EMBODIMENT

Figure 3:
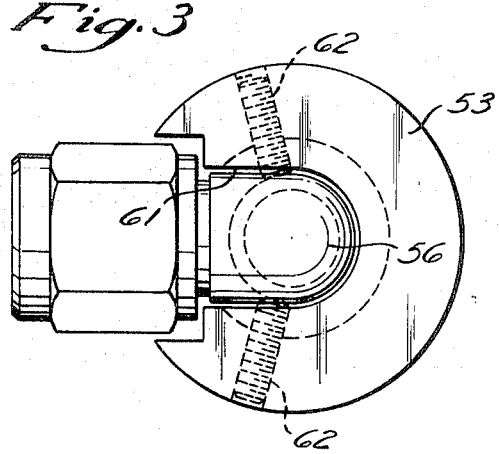
FIG. 3 is a plan view of the sleeve locator used in the machine shown in FIG. 1.

Referring now to the drawings in greater detail, FIG. 1 shows a crimping machine in which vertical movement of a ram is changed by a camming action to radial displacement of a plurality of crimping fingers to crimp a sleeve onto a tubular member inserted therein. The machine may be used to crimp nearly any type of sleeve including, for example, electrical connectors, shell bands, or the like, but is shown and described in detail hereinafter with particular reference to crimping end fittings to lengths of flexible hose.

The power to operate the machine is provided by a fluid motor 10 which includes a cylinder 11 divided into upper and lower expansible chambers (not shown) by a piston (not shown) therein. The fluid motor 10 is secured to an upper support plate 12 of the crimping machine by the studs 13 and by the end plates 14. The upper support plate 12 is interconnected to a base plate 15 by the vertical columns 16, which hold the plates in positions of precise alignment. An electric motor 21 is provided to drive a hydraulic pump 22 which supplies high pressure fluid to a four-way selector valve 23 from the fluid reservoir 24. The valve 23 is operable to selectively interconnect either of the expansible chambers of the fluid motor 10 to the high pressure fluid from the pump 22, and the other expansible chamber to the reservoir 24 to axially displace the piston in either direction within the cylinder 11.

The fluid motor 10 is further provided with a piston rod 28 connected to the piston to axially advance or retract a ram 29 when fluid pressure is supplied to one or the other of the expansible chambers. The ram 29 is a generally cylindrical member having a closed end 30 which is threadably secured to the piston rod 28 and an opened end opposite thereto. The ram 29 is further provided with a slotted portion 31 in its cylindrical side wall for purposes that will become more readily apparent with reference to the operation of the machine.

An internally coned, cylindrical socket member 35 is secured to the base plate 15 in precise alignment with the ram 29. The socket 35 is provided with a bore 36 extending therethrough, one end of which opens to a bore 37 through the base plate 15. The other end of the bore 36 reaches to an internally coned surface 39 which provides a camming surface to effect the radial displacement of the crimping dies. Although the preferred embodiment of the invention utilizes an internally coned surface to effect the radial displacement of the crimping dies, any suitable cam could be utilized for this purpose. Therefore, the term "socket" as used herein refers to any such suitable cam and is not limited to the coned surface illustrated in the preferred embodiment.

Figure 6:
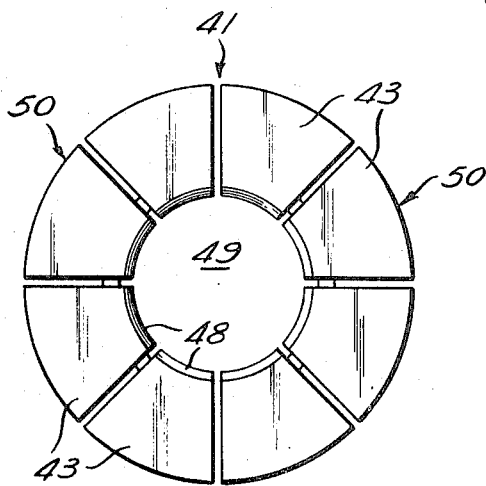
FIG. 6 is a plan view of the split collet in its closed position as used in the FIG. 1 crimping machine.

The actual crimping of the sleeve is performed by a spring type collet 41. The collet 41 includes a plurality of cooperating spring fingers 43 which are interconnected by and which extend from a common base 44 at one of their ends. A spring portion 45 reaches from the common base 44 to an enlarged free end of the spring fingers 43. The free end of each spring finger 43 is provided with an internal crimping die segment 48 which cooperates with the die segment of each of the other spring fingers 43 of the collet 41 to define a generally circular die cavity 49 (FIG. 6). The die cavity 49 may be closed or opened by radial displacement of the fingers 43 to crimp or to release the sleeve in a manner more fully described hereinafter. The free end of each spring finger 43 is also provided with an externally coned surface 51 which acts as a cam follower surface to cooperate with the internally coned surface 39 of the socket 35 to close and open the die cavity 49 in a manner more fully described hereinafter.

Figure 5:
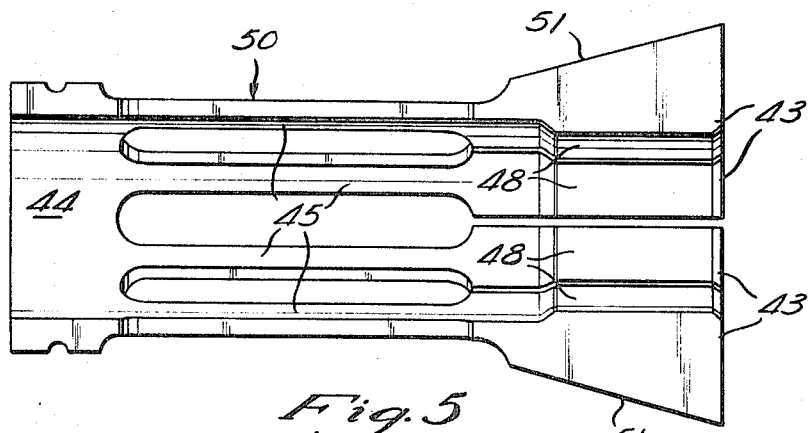
FIG. 5 is a side elevational view of one section of a split collet that may be used in the crimping machine shown in FIG. 1.

In the preferred embodiment, the collet 41 is split into two substantially identical, approximately semi-circular, disjuncted sections 50, one of which is shown in FIG. 5. This enables the sleeve to be easily positioned within or removed from the die cavity 49 without having to open the die cavity 49 excessively wide, as will become more readily apparent with reference to the operation of the machine. Although in the preferred embodiment the collet 41 is divided into two semicircular sections 50, the collet 41 could be divided into any desired number of sections each of which subtend any desired arcuate portion of the collet 41.

To properly position a fitting sleeve axially within the die cavity 49, the invention provides a sleeve locator 53 as shown in FIGS. 1, 2 and 3. As shown in these figures, the sleeve 54 that is to be crimped onto the hose 55 is provided with a 90° elbow connector 56. The sleeve locator 53 includes a generally cylindrical member having a locating shoulder 59 for receiving in abutting engagement the enlarged wrench receiving portion 60 of the elbow 56 to insure proper axial placement of the sleeve 54 within the die cavity 49. The locator 53 is further provided with a slotted portion 61 for receiving the radially extending portion of the elbow 56. The two cooperating set screws 62 insure that the sleeve 54 and its appended elbow 56 will not slip out of position during the crimping operation. For high volume production use, these set screws 62 could be replaced by spring biased ball type detents.

Figure 4:
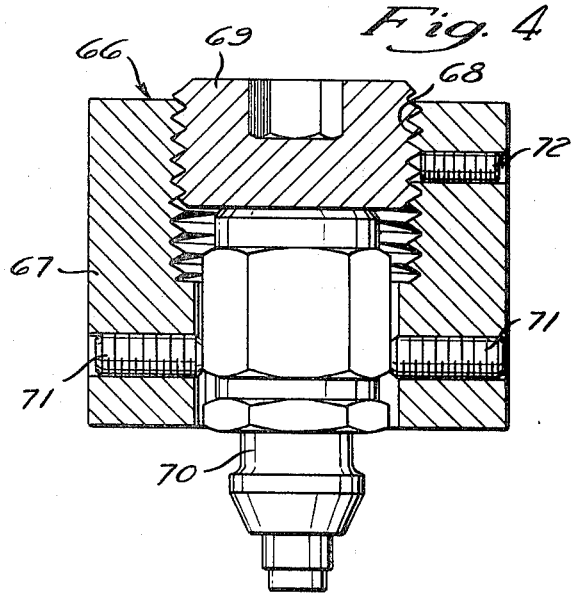
FIG. 4 is a cross-sectional, side elevational view of a second type of sleeve locator that may be used in the crimping machine shown in FIG. 1.

Since any one of numerous appendages, such as elbows, T connectors, straight connectors or the like, may be appended to the sleeve that is to be crimped, it may be necessary to provide different types of sleeve locators for different types of fittings. For example, although a sleeve locator such as locator 53 is satisfactory to locate fittings that have some type of enlarged flange for the shoulder 59 to bear against such as the wrench receiving portion 60, other types of sleeves may not have such flanged portions. For such sleeves that do not have convenient flanged portions, the sleeve locator 66 as shown in FIG. 4 may be used. The locator 66 includes a generally tubular body 67 having a threaded end portion 68 within which a plug member 69 is threadably secured. End fittings having no flanged portion which may be located against, such as the straight connector 70, are inserted within the locator 66 so that their top surface engages the plug member 69 to locate the fitting. The set screws 71 which also may be replaced by spring biased ball type detents for high production usage, are provided to secure the fitting 70 within the locator. The plug member 69 is provided with a hexagonal socket to receive an Allen wrench to axially adjust the plug 69. The set screw 72 is provided to lock the plug 69 in its proper position.

Having described the structural details of the crimping machine, its method of operation can now be more readily understood. The sleeve that is to be crimped is positioned within its locator, which may be similar to the locator 53 or 66 as described above or any other suitable locating device. The sleeve 54 is then positioned within the collet 41 by insertion into the die cavity 49 if the collet is a single piece collet, or by placing the sections 50 around the sleeve if the collet is split. A generally flat, annular pusher ring 75 having an opening 76 therein is placed on the top surface of the collet 41 to insure uniform application of the crimping force to all of the spring fingers 43. Although the pusher ring 75 in the preferred embodiment is positioned intermediate the sleeve locator 53 and the collet 41, the bore 76 could be made large enough that the sleeve locator 53 would rest directly on the top surface of the collet 41. However, it is preferred that the bore 76 be as small as possible to approach the diameter of the opened die cavity 49 to insure uniform application of the axial force across the end face of the collet 41.

With the ram 29 in its retracted position as shown in FIG. 1, the sleeve 54 positioned within the collet 41 and axially located by the sleeve locator 53, is placed within the internally coned socket 35. The hose 55 is properly positioned within the sleeve 54 and held therein by friction between the hose 55 and the sleeve 54.

It may be appreciated that factors such as the size of the sleeve 54 and the hose 55, the space beneath the base plate 15 the availability of space above the socket 35 when the ram 29 is retracted, and the number of collet sections 50 are all factors that may require or suggest that the sleeve 54 be placed within the die cavity 49 in a manner different from that described above. For example, in some instances, it may be found that it may be easier to position the sleeve 54 within the die cavity 49 after the collet 41 has been placed within the socket 35. In the preferred embodiment, the free internal diameter of the crimping die 49 of the collet 41 is greater than the uncrimped external diameter of the sleeve 54 so that this may be done. Furthermore, depending upon the length, diameter and flexibility of the hose 55, it may be easier to assemble the hose 55 within the sleeve 54 before placing the sleeve 54 in the die cavity.

With the sleeve 54 properly positioned within the die cavity 49 and the collet 41 positioned within the internally coned portion of camming surface 39 of the socket 35, the valve 23 is actuated to supply high pressure fluid to the upper expansible chamber of the fluid motor 10, and to connect the lower expansible chamber of the motor 10 to the reservoir 24. This results in the piston (not shown) of the fluid motor 10 moving downwardly as viewed in FIG. 1 to advance its piston rod 28 and the ram 29 toward the socket 35. As the ram 29 is advanced, the slotted portion 31 provides clearance for the elbow 56 so that the ram 29 may be of a smaller diameter to save space and to apply the axial force to the end face of the collet 41 in a more uniform manner. The pusher ring 75 then provides a still more uniform distribution of the axial force across the end face of the collet 41, including that portion of the end face beneath the slotted portion 31 of the ram 29.

When the ram 29 contacts the pusher ring 75 and the collet 41 is advanced into the internally coned portion of the socket 35, the spring fingers 43 are forced radially inwardly to close the die cavity 49 so that the crimping die segments 48 crimp the sleeve 54 onto the tubular member 55. The mechanical advantage between the axial force applied by the ram 29 and the radial crimping force applied by the die segments 48 is determined by the angle of inclination 77 of the cooperating camming surfaces 39 and 51. The choice of this angle depends upon the particular application of the crimping machine and in the preferred embodiment the angle is about 15° to give about a four to one mechanical advantage.

The amount of radial displacement of the spring fingers 43 is, for any fixed angle of inclination 77 of the matched conical surfaces, dependent upon the amount of axial displacement of the collet 41 into the internally coned socket 35. In the preferred embodiment, the axial displacement of the collet 41 is controlled by engagement of the lower surface of the pusher ring 75 with the top surface of the socket 35. This provides a positive stop means to control the deformation of the sleeve 54, as is best seen in FIG. 2 where the ram 29 is shown in its fully advanced position with the pusher ring 75 contacting the socket 35. With the ram 29 in its fully advanced position as shown in FIG. 2, the collet 41 assumes its fully closed position as shown in FIG. 6. In this fully closed position, a small space is left between adjacent spring fingers 43 to provide spaces for the portions of the sleeve 54 which are between adjacent die segments and which are not deformed radially inwardly.

After the sleeve 54 has been crimped in the manner described above, the valve 23 is actuated to connect the upper expansible chamber of the fluid motor 10 to the reservoir 24 and to connect the lower expansible chamber of the fluid motor 10 to high pressure fluid from the pump 22. This retracts the ram 29 to the position shown in FIG. 1 and allows the radially outward spring force exerted by the spring portions 45 to lift the collet 41 out of the socket 35 to open the die cavity 49 and to allow removal of the sleeve 54. If the collet is not split, or if there is no sleeve or other enlarged member on the other end of the tubular member 55, the sleeve can be simply taken out of the collet without removing the collet from the socket 35. However, if the collet is split as described above and the free open diameter of the collet will not permit removal of the sleeve, the entire collet 41 with the sleeve 54 therein is simply removed from the socket 35. Thus, the collet sections 50 are simply removed from the crimped sleeve 54.

With the collet split as described above, the spring fingers 43 do not have to be opened wide enough to allow the passage of a fitting on the other end of the tubular member 55, which may be a 90° elbow or other large fitting and the machine may be made small enough to provide a portable unit for field service. Furthermore, the machine may be readily adapted to accommodate various size sleeves by changing the collet 41, or, if a substantially different range of sizes is required, by changing the internally coned socket 35 as well as the collet 41. Still further, the mechanical advantage of the system can be easily changed to provide the radial crimping force required to crimp various sizes of sleeves by simply changing the angle of inclination 77.

Although preferred embodiments of the invention have been shown and described in detail, it is to be understood that various modifications and rearrangements may be resorted to without departing from the scope of the invention.

We claim:

1. A crimping machine for crimping cylindrical sleeves comprising a spring collet, a socket, and a means to produce relative axial movement between said collet and said socket, said collet including a base portion and a plurality of spring fingers, each of said spring fingers including an enlarged end and a resilient spring portion connecting said enlarged end to said base portion, said enlarged ends each having an internal surface and an external surface, said internal surfaces each having a crimping die segment and said external surfaces each having an externally coned surface, said crimping die segments cooperatively defining a generally circular crimping die means for receiving a workpiece therein and for deforming said workpiece, said resilient spring portions each being rigidly connected to said base portion and to its associated end portion to normally hold said crimping die segments in a radially outward position to open said die means, said socket having an internally coned surface means for receiving said externally coned surface of said spring fingers and for forcing said crimping die segments radially inwardly to substantially bend said resilient spring portions to a deflected position and to close said die means upon relative axial movement of said collet and said socket, the resilience of said bent spring portions in said deflected position providing a radial force to return said die segments to said radially outward position to open said crimping die means, said collet being split longitudinally into two substantially identical disjuncted sections, each of said sections having a plurality of said spring fingers, and each of said sections being individually removably connected to said socket.

2. A crimping machine as set forth in claim 1 wherein said means to produce relative axial movement includes a hollow generally cylindrical ram means for applying an axial force to the radial end face of said enlarged ends and for axially displacing said externally coned surface into said internally coned surface to substantially bend said resilient spring portions to a deflected position and to close said die cavity, the resilience of said bent spring portions in said deflected position providing the sole radial force to return said die segments to said radially outward position, and said ram having an axially slotted side wall for receiving a radially outwardly projecting appendage of said end fitting.

3. A die assembly for a hose end crimping machine adapted to produce relative movement between component parts of said crimping die assembly, said crimping die assembly comprising a socket having a centrally disposed opening and an end surface, said socket having the surface defining said opening flaring conically outwardly toward said end surface, and a collet arranged to fit within said socket, said collet including at least one base portion and a plurality of spring fingers extending from said base portion into said central opening of said socket, each of said plurality of spring fingers having a resilient spring portion and a crimping die segment on the end thereof away from said base portion, each of said resilient spring portions being rigidly connected to said base portion and to its associated crimping die segment and holding said crimping die segment in a radially outward position, said crimping die segments each including an inner surface means for receiving the outer surface of a hose end and for crimping said hose end onto a hose, said crimping die segments each having an external surface means engageable with said conical surface on said socket for causing said crimping die segments to move radially inward relative to said base portion to substantially bend said spring portion to a deflected position and to crimp said hose end in position within said collet, the resilience of said bent spring portions in said deflected position providing a radial force to return said die segments to said radially outward position, said collet being split longitudinally into two disjuncted sections, and each of said sections being individually removable from said socket.

4. A die assembly as set forth in claim 3 wherein said resilience of said spring fingers in said deflected position provides the sole biasing force to move said crimping die segments radially outwardly upon movement of said collet in the other direction with respect to said socket.

5. A die assembly for a hose end crimping machine adapted to produce relative movement between component parts of said crimping die assembly, said crimping die assembly comprising a socket having a centrally disposed opening and an end surface, said socket having the surface defining said opening flaring conically outwardly toward said end surface, and a collet arranged to fit within said socket, said collet including at least one base portion and a plurality of spring fingers extending from said base portion into said central opening of said socket, each of said plurality of spring fingers having a resilient spring portion and a crimping die segment on the end thereof away from said base portion, each of said resilient spring portions being rigidly connected to said base portion and to its associated crimping die segment and holding said crimping die segment in a radially outward position, said crimping die segments each including an inner surface means for receiving the outer surface of a hose end and for crimping said hose end onto a hose, said crimping die segments each having an external surface means engageable with said conical surface on said socket for causing said crimping die segments to move radially inward relative to said base portion to substantially bend said spring portion to a deflected position and to crimp said hose end in position within said collet, the resilience of said bent spring portions in said deflected position providing a radial force to return said die segments to said radially outward position, said collet being split longitudinally into two disjuncted sections, each of said sections being individually removable from said socket, said resilience of said spring fingers in said deflected position providing the sole biasing force to move said crimping die segments radially outwardly upon movement of said collet in the other direction with respect to said socket, and said resilience of said spring fingers in said deflected position providing the sole biasing force for moving said collet axially out of said socket.

6. A crimping machine for crimping cylindrical sleeves comprising a socket having a centrally disposed opening, and a collet arranged to fit within said opening of said socket, said collet including at least two disjuncted collet sections, each of said collet sections including a plurality of individual crimping die segments, first resilient means permanently securing said crimping die segments of one of said collet sections together and normally holding said crimping die segments of said one collet section in a radially outward position, second resilient means permanently securing said crimping die segments of another of said collet sections together and normally holding said crimping die segments of said other collet section in a radially outward position, said crimping die segments of said sections cooperatively defining a crimping die cavity means for receiving a workpiece therein and for deforming said workpiece, and at least one of said collet sections being separately removable from said socket and from each of said other collet sections to permit removal of said workpiece from said crimping die cavity means.

7. A crimping machine as set forth in claim 6 wherein said centrally disposed opening is an internally coned surface means, and each of said crimping die segments includes an externally coned surface means for engaging said internally coned surface means of said socket.

8. A crimping machine as set forth in claim 6 wherein each of said crimping die segments includes external surface means for engaging said socket and for displacing said die segments radially inwardly from said radially outward position and deforming said first and second resilient means, and the resilience of said first and second resilient means providing a radial force to return said die segments to said radially outward position.

9. A crimping machine for crimping cylindrical sleeves comprising a socket having a centrally disposed opening, and a collet arranged to fit within said opening of said socket, said collet including at least two disjuncted collet sections, each of said collet sections including a plurality of individual crimping die segments, first resilient means permanently securing said crimping die segments of one of said collet sections together and normally holding said crimping die segments of said one collet section in a radially outward position, second resilient means permanently securing said crimping die segments of another of said collet sections together and normally holding said crimping die segments of said other collet section in a radially outward position, said crimping die segments of said sections cooperatively defining a crimping die cavity means for receiving a workpiece therein and for deforming said workpiece, at least one of said collet sections being separately removable from said socket and from each of said other collet sections to permit removal of said workpiece from said crimping die cavity means, said centrally disposed opening being an internally coned surface means, each of said crimping die segments including an externally coned surface means for engaging said internally coned surface means of said socket and for displacing said die segments radially inwardly from said radially outward position and deforming said first and second resilient means, the resilience of said first and second resilient means providing a radial force to return said die segments to said radially outward position, and said resilience of said resilient means providing the sole biasing force for moving said sections of said collet axially out of said socket.

10. A crimping machine comprising a collet, a socket, and means for producing relative axial movement between said collet and said socket, said collet including a first crimping die section and a second crimping die section received by said socket, said first and second crimping die sections each including a plurality of crimping die segments and spring means holding said crimping die segments in radially outward predetermined positions of spaced adjacency when said collet and said socket are in first positions relative to one another, said die segments each including an internal crimping die surface, said internal crimping die surfaces cooperatively defining a crimping die means for receiving a workpiece therein and for deforming said workpiece upon relative movement of said collet and said socket from said first positions to second relative positions by operation of said first mentioned means, said spring means deforming and permitting said die segments to be displaced radially inwardly from said radially outward position upon said relative movement of said collet and said socket to said second relative positions, and said first and second crimping die sections being disjoined from one another and individually removable from said socket for permitting insertion and removal of said workpiece.

11. A crimping machine as set forth in claim 10 wherein each of said crimping die sections is substantially semicircular.

12. A crimping machine as set forth in claim 10 wherein each of said crimping die segments includes an externally coned external surface, and said externally coned surface is received by an internally coned surface of said socket.

References Cited

UNITED STATES PATENTS

| 3,085,316 | 4/1963 | Nelson | 29—517 |
| 3,096,876 | 7/1963 | Scudieri | 29—508 |
| 3,158,923 | 12/1964 | Reinsma | 29—508 |
| 2,311,662 | 2/1943 | Hunziker | 29—237 |
| 3,348,292 | 10/1967 | Turner et al. | 29—237 |
| 2,978,263 | 4/1961 | Walsh et al. | 29—508 |
| 2,815,217 | 12/1957 | Fortunski | 72—402 |
| 741,073 | 10/1903 | Schrader | 72—402 |

CHARLES W. LANHAM, Primary Examiner

M. J. KEENAN, Assistant Examiner

U.S. Cl. X.R.

29—237

Docket No. 16-337

UNITED STATES PATENT OFFICE
CERTIFICATE OF CORRECTION

Patent No. 3,720,088   Dated March 13, 1973

Inventor(s) Bruce H. Pauly, John Nicol and Karl K. Chen

It is certified that error appears in the above-identified patent and that said Letters Patent are hereby corrected as shown below:

Column 2, line 13, change "a" to ---at--.

Column 5, line 23, change "locator" to -- locators --.

Column 5, line 64, change "of" to -- or --.

Column 6, line 52, change "Thus" to -- Then --.

Signed and sealed this 10th day of July 1973.

(SEAL)
Attest:

EDWARD M. FLETCHER, JR.　　　　　Rene Tegtmeyer
Attesting Officer　　　　　　　　Acting Commissioner of Patents